United States Patent [19]
Wakui

[11] Patent Number: 5,568,032
[45] Date of Patent: Oct. 22, 1996

[54] POSITION CONTROL SYSTEM

[75] Inventor: Shinji Wakui, Utsunomiya, Japan

[73] Assignee: Canon Kabushiki Kaisha, Tokyo, Japan

[21] Appl. No.: 448,660

[22] Filed: May 24, 1995

[30] Foreign Application Priority Data

May 24, 1994 [JP] Japan .................................... 6-132405

[51] Int. Cl.⁶ .................................................. H01L 21/68
[52] U.S. Cl. .......................... 318/632; 318/610; 318/652; 310/311
[58] Field of Search ............................... 318/560, 568.22, 318/575, 590, 592, 601, 602, 604, 605, 609, 610, 611, 632, 649, 651, 652, 678; 310/311

[56] References Cited

U.S. PATENT DOCUMENTS

| | | | |
|---|---|---|---|
| 4,928,030 | 5/1990 | Culp | 310/328 |
| 5,079,492 | 1/1992 | Takagi | 318/621 |
| 5,196,745 | 3/1993 | Trumper | 310/12 |
| 5,262,707 | 11/1993 | Okazaki et al. | 318/592 |

*Primary Examiner*—Bentsu Ro
*Attorney, Agent, or Firm*—Fitzpatrick, Cella, Harper & Scinto

[57] ABSTRACT

A position control system which includes a plurality of actuators for moving an object, a plurality of sensors for detecting the state of the object, a first circuit for extracting a state signal, in each of different kinetic modes related to the object, from outputs of the sensors, a compensating circuit for compensating for the state signals in the respective kinetic modes, a second circuit for distributing an output of the compensating circuit and for providing drive signals for the actuators in accordance therewith, and a driver for driving the actuators in response to the drive signals.

10 Claims, 11 Drawing Sheets

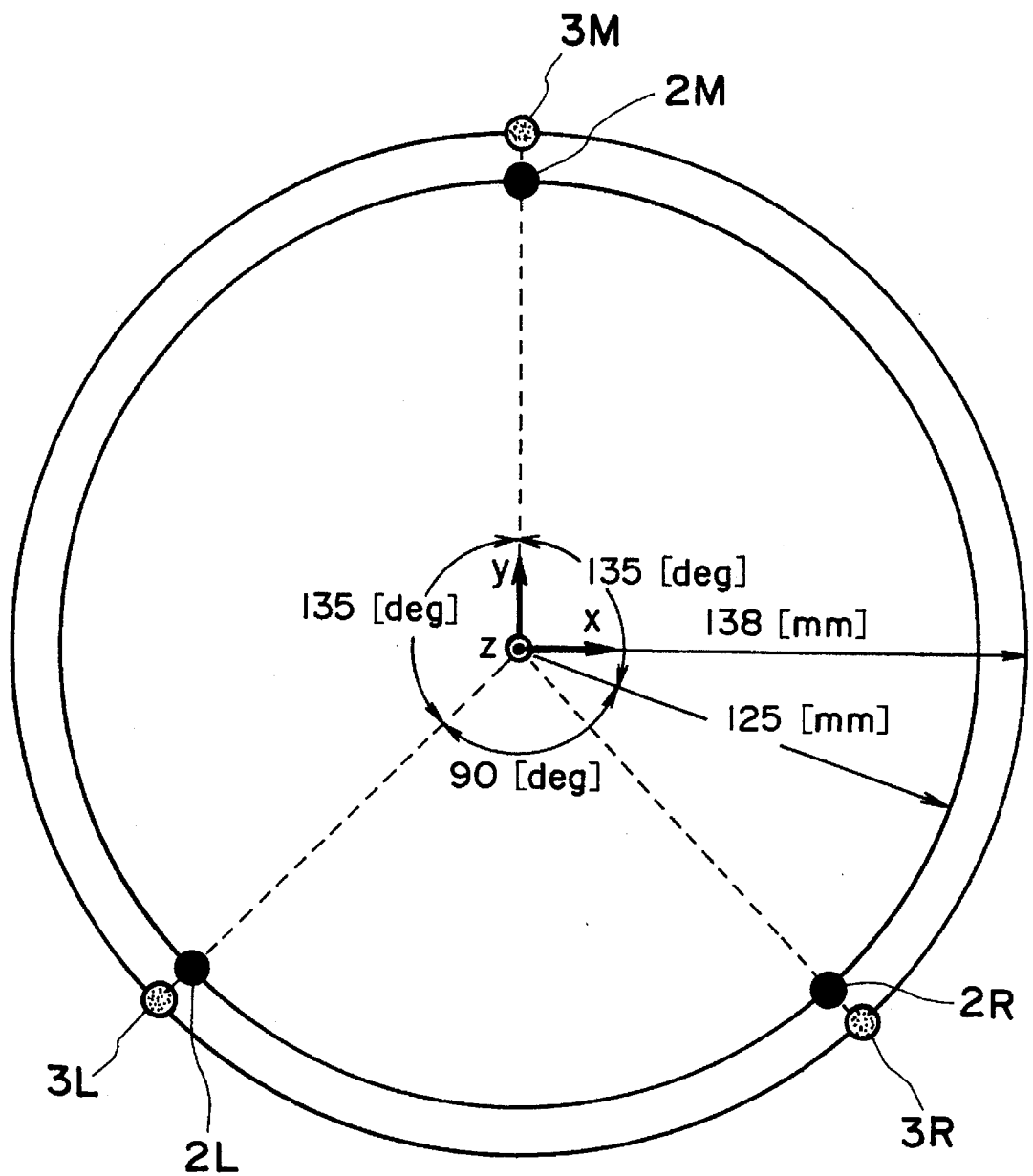
F I G. 2

WITHOUT ACCELERATION FEEDBACK

WITH ACCELERATION FEEDBACK

POSITION CONTROL SYSTEM

FIELD OF THE INVENTION AND RELATED ART

This invention relates generally to a position control system and, more particularly, to a fine-motion positioning control system for positioning an object, to be positioned, at a desired position and in a desired attitude.

Recently, positioning precision of the submicron order has been required with respect to the positioning operation in the field of precise machining, assembling or adjustment. Particularly, in a ultra high precision positioning stage to be used in exposure of a fine pattern, in many cases, piezoelectric devices or electrostrictive devices are used as actuators, for attaining higher driving resolution and a wider range of frequency response.

FIG. 11 is a block diagram of a known type of fine-motion positioning control system which is arranged to perform positioning control with respect to three degrees of freedom, i.e., one freedom of movement with respect to a vertical direction and two freedoms with respect to inclination within a horizontal plane. Denoted in the drawing at 1 is a flat substrate which is to be positioned. Denoted at 2M, 2R and 2L are actuators for producing displacement in the vertical direction. These actuators include a displacement magnifying mechanism comprising a piezoelectric device as a driving element. Disposed near the driving positions of the actuators 2M, 2R and 2L are position sensors 3M, 3R and 3L for measuring displacement of the substrate 1 in the vertical (z axis) direction. Here, these components will be referred to as a fine-motion positioning mechanism.

The displacement of the substrate 1 in the vertical direction as measured by the position sensors 3M, 3R and 3L is transformed by displacement amplifiers 4M, 4R and 4L into electrical signals $z_M$, $z_R$ and $z_L$. These electrical signals are compared with voltages applied to command voltage input terminals 5M, 5R and 5L, respectively, and differential signals $e_M$, $e_R$ and $e_L$ are produced. These differential signals are applied to differential amplifiers 6M, 6R and 6L so as to obtain a predetermined sensitivity, and then are applied to compensators 7M, 7R and 7L which are provided to perform control loop adjustment. Power amplifiers 8M, 8R and 8L are driven with the outputs of these compensators, to cause upward or downward motion of the actuators 2M, 2R and 2L to translationally move the substrate 1 upwardly or downwardly or, alternatively, to tilt the same with respect to the z axis. Here, this closed loop will be referred to as a feedback system. Also, the fine-motion positioning mechanism described above and the feedback system just described will now be called as a fine-motion positioning control system.

In the above-described arrangement, each of the power amplifiers 8M, 8R and 8L is of the type that outputs an electric current in response to reception of an input voltage. Here, the compensators 7M, 7R and 7L serve as compensators for performing gain adjustment only. This is because the piezoelectric device which constitutes the actuator 2M, 2R or 2L is a capacitor, in an electric sense, and the transfer function including the power amplifiers 8M, 8R and 8L as well as the piezoelectric devices to be driven thereby includes an integrator. Thus, this control loop is of what can be called a "1-type" and, according to control theory, a steady difference "zero" is automatically assured. Therefore, the compensators 7M, 7R and 7L are not required to have an integrator.

For ease in understanding, referring now to FIG. 12, a dynamical model with one degree of freedom will be explained. The transfer function G(s) of a single axis positioning mechanism having an actuator of piezoelectric device, for example, can be expressed as follows:

$$G(s)=(cs+k)/(ms^2+cs+k) \qquad (1)$$

where m is the mass, c is the viscosity friction coefficient, and k is the spring constant. When a single axis positioning mechanism having such a transfer function G(s) is driven through a current output type power amplifier such as amplifiers 8M, 8R and 8L, the transfer function is expressed as follows:

$$(k_i/s)\cdot\{(cs+k)/(ms^2+cs+k)\} \qquad (2)$$

wherein $k_i$ is the integration gain having [m/Vs] order. Thus, without providing the compensators 7M, 7R and 7L with integrators, the current output type power amplifiers 8M, 8R and 8L already include integrators, such that as the control loop is closed, the steady difference "zero" is assured.

The transfer function $G_c(s)$ from a target value when the loop is closed with a gain of $k_{loop}$ as the subject of control of equation (2), can be expressed as follows:

$$G_c(s)=[k_{loop}k_i\{(cs+k)/(ms^2+cs+k)\}]/\{s+k_{loop}k_i\{(cs+k)/(ms^2+cs+k)\}\} \qquad (3)$$

Generally, a positioning mechanism is made rigid and, therefore, the characteristic of the transfer function G(s) of a single axis positioning mechanism is retained even up to a high frequency region. Namely, the transfer function G(s) of the single axis positioning mechanism expressed by equation (1) can be regarded as "1". Here, the value between the symbols "{" and "}" in equation (3) becomes equal to "1" and, thus, equation (4) below is given:

$$G_c(s)=(k_{loop}k_i)/(s+k_{loop}k_i) \qquad (4)$$

What is meant by the above equation is important. Equation (4) suggests that a response from a target value can be expressed in terms of primary delay. Thus, no overshooting is produced in the response, and the convergency thereof can be adjusted as desired through adjustment of the gain $k_{loop}$. Actually, if the response of the system as a whole is quickened with a larger $k_{loop}$, the transfer function G(s) of equation (1) can not be regarded as "1" any more. In other words, the mechanical resonance of the single axis positioning mechanism becomes dominant and thus the system becomes unstable. This means that the adjustment which does not cause overshooting in the response is allowed only in the case where $k_{loop}$ is relatively small. If the loop gain $k_{loop}$ is made small, from the problem of stability, not only the convergency with regard to the target value cannot be enhanced but also the external disturbance suppressing property has to be left insufficient. While in the foregoing the limit to improving the response characteristic by use of a single axis positioning mechanism has been described, for ease of understanding, this essentially applies to a case of a three-axis fine-motion positioning control system as shown in FIG. 11.

Next, the gain adjustment of the positioning control system will be explained. In the fine-motion positioning control system shown in FIG. 11, the feedback system to the fine-motion positioning mechanism is of a three-axis independent structure, and the portion for performing the parameter adjustment is provided with the compensators 7M, 7R and 7L. In the sense of hardware, the gain setting can be done with respect to the three axes independently of each other. Actually, however, only the same gain adjustment is possible. The reason is clear. Where the gains of the actuators 2M, 2R and 2L and of the position sensors 3M, 3R and 3L involves a large dispersion, this may be corrected if the gain setting is possible with respect to each of the three axes independently. However, in a case where the dispersion is small as can be disregarded or in a case where, if the dispersion is not small, the application of an offset gain has already been performed to correct the dispersion, there is only one way for the parameter adjustment that the same gain is set with respect to the three axes. There is no inevitability in such adjustment as setting the three largely different gains. For a more specific explanation, an example of a root locus upon the gain adjustment is illustrated in FIG. 13. Arrows in the drawing each depicts the movement direction of the root with increases with the gain. As the gains of the compensators 7M, 7R and 7L are enlarged by the same amount, paying attention to the complex root, translational motion in the z-axis direction and rotational motion about the y axis as well as rotational motion about the x axis, in this order, come close to an imaginary axis. There is no freedom of disposing complex roots of the respective kinetic modes separately. The gains of the compensators 7M, 7R and 7L can be enlarged only within a range in which the stability margin is retained and the translational motion in the z-axis direction does not become unstable. If the gains are fixed, the complex root of the rotational motion within the plane of the substrate 1 would be determined dependently and definitely. Therefore, such a conventional feedback system is not able to meet the recent need that the positioning time period has to be reduced as much as possible with use of a given fine-motion positioning mechanism. This will be understood from the following: Referring again to FIG. 13, if the gains of the compensators 7M, 7R and 7L are enlarged to the same level as much as possible while keeping a margin of stability for the translational motion in the z-axis direction, in such case the positioning characteristic with respect to the translational motion would be best unless the system is such that only a command for translational motion in the z-axis direction is applied to the substrate 1. However, the two rotational motions along the plane are present on the left-hand side with respect to the placement of the complex root of the translational motion. There is more margin with respect to the stability. The characteristic frequency (natural frequency) thereof is low. Namely, improving the positioning performance with respect to the rotational motion along the plane is not attainable, as long as such a feedback system as of the conventional fine-motion positioning control system is used.

As described, in the conventional fine-motion positioning control device, there is a problem that, if the control loop gain is enlarged gradually so as to reduce the positioning time and to enhance the external disturbance suppressing characteristic as much as possible, the mechanical resonance of the mechanism is excited and the performance improvement is limited. Further, particularly in the case of a three-axis fine-motion mechanism, there are kinetic modes of translation and inclination in the plane. With the conventional control arrangement, if the control loop gain is enlarged, of the one degree of freedom of translational motion and the two degrees of freedom of rotational motions, the translational kinetic mode may be operated voluntarily, whereas the two rotational motions would be determined dependently with the characteristic adjustment to the translational motion mode. Namely, there is a problem that the control performances of the respective kinetic modes of the three-axis fine-motion mechanism cannot be adjusted finely.

SUMMARY OF THE INVENTION

It is an object of the present invention to provide a solution for at least one of the problems described hereinbefore.

It is another object of the present invention to provide a fine-motion positioning and non-interfering control system with a non-interfering feedback system in which, when an expensive fine-motion positioning mechanism is given, supreme control performance can be easily assured by use of such a positioning mechanism.

It is a further object of the present invention to provide a fine-motion positioning control system having a non-interfering feedback system by which the loop gain adjustment is able to be performed with respect to each of different kinetic modes and in which, in the adjustment, no excessive overshooting is produced in the response waveform.

It is a still further object of the present invention to enhance the control performance of a fine-motion positioning mechanism as much as possible, this being done by applying damping to each kinetic mode, independently of the other or others, so as to provide a dynamically non-interfering system.

In accordance with an aspect of the present invention, there is provided a position control system which comprises: a plurality of actuators for moving an object: a plurality of sensors for detecting the state of the object: a first circuit for extracting a state signal, in each of different kinetic modes related to the object, from outputs of the sensors; a compensating circuit for compensating for state signals in the respective kinetic modes; a second circuit for distributing an output of the compensating circuit and for providing drive signals for the actuators; and a driver for driving said actuators in response to the drive signals.

Each sensor may comprise an acceleration sensor, for providing a dynamic non-interfering system.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2 is a schematic view of coordinates of actuators and position sensors used in the system of the FIG. 1 embodiment.

DESCRIPTION OF THE PREFERRED EMBODIMENTS

Preferred embodiments of the present invention will now be described in conjunction with the drawings.

First Embodiment

Figure 1:
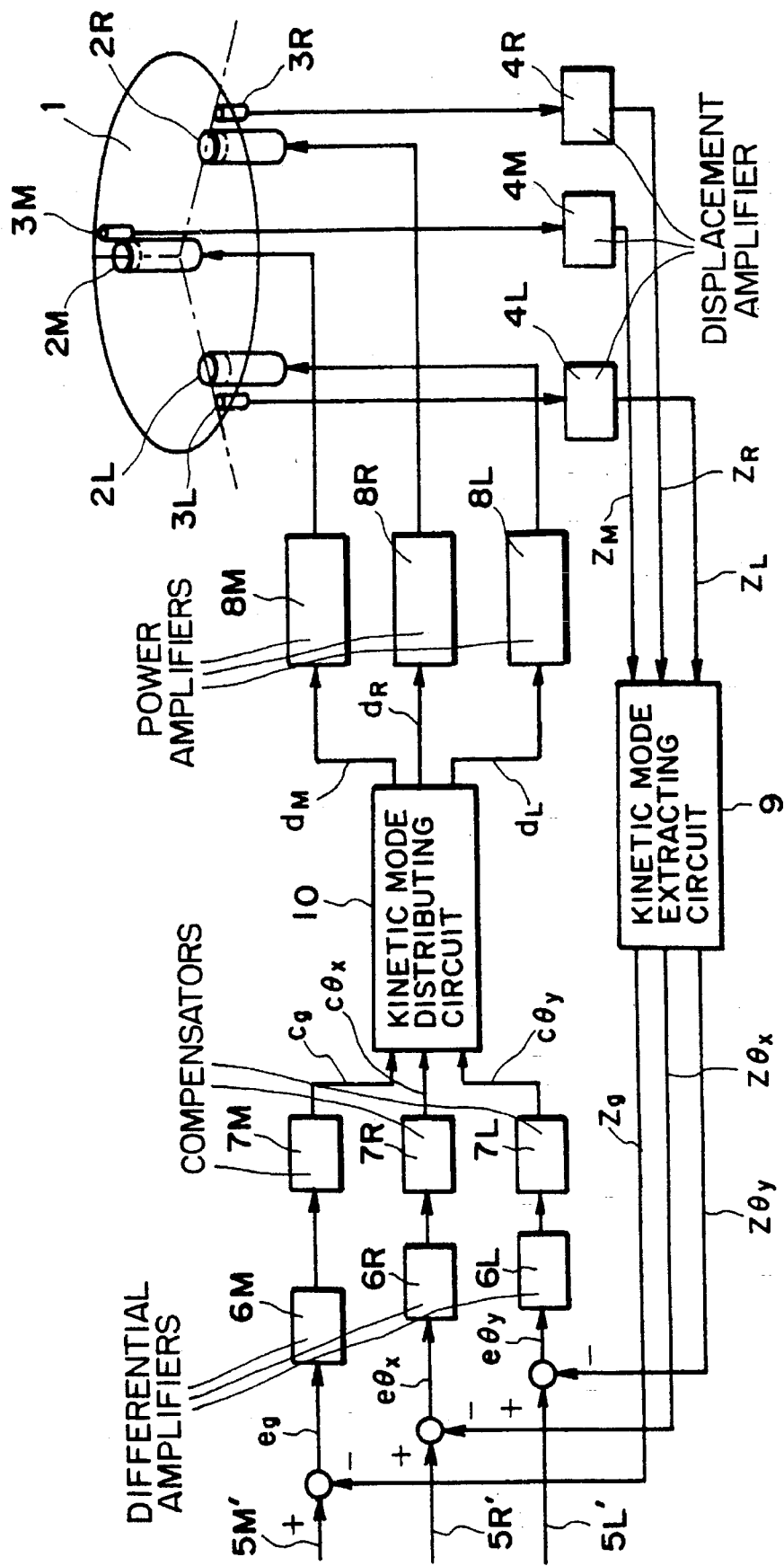
FIG. 1 is a block diagram of a fine-motion positioning non-interfering control system according to a first embodiment of the present invention.

FIG. 1 is a block diagram, showing the structure of a fine-motion positioning non-interfering control system according to a first embodiment of the present invention. This embodiment has a feature that, as compared with the structure of the fine-motion positioning control system shown in FIG. 11, the system is provided with a kinetic mode extracting circuit 9 and a kinetic mode distributing circuit 10.

The operation will be explained here with reference to FIG. 1. Displacement of a substrate 1 in the vertical (z-axis) direction as measured by position sensors 3M, 3R and 3L, is transformed by displacement amplifiers 4M, 4R and 4L into electrical signals $z_M$, $z_R$ and $z_L$. These electrical signals are applied to the kinetic mode extracting circuit 9, and kinetic mode displacement signals $z_g$, $z\theta_x$ and $z\theta_y$ are produced. The arithmetical operation to be performed in the kinetic mode is expressed by equation (5) below:

$$\begin{bmatrix} z_g \\ z\theta_x \\ z\theta_y \end{bmatrix} = \begin{bmatrix} 0.4142 & 0.2929 & 0.2929 \\ 0.5858 & -0.2929 & -0.2929 \\ 0 & -0.5 & 0.5 \end{bmatrix} \begin{bmatrix} z_M \\ z_R \\ z_L \end{bmatrix} \quad (5)$$

Subsequently, the kinetic mode displacement signals $z_g$, $z\theta_x$ and $z\theta_y$ are compared with voltages applied to command voltage input terminals 5M', 5R' and 5L', respectively, whereby kinetic mode differential signals $e_g$, $e\theta_x$ and $e\theta_y$ are produced. These differential signals are applied to differential amplifiers 6M, 6R and 6L, respectively, to obtain a predetermined sensitivity. Outputs of the differential amplifiers 6M, 6R and 6L are applied to compensators 7M, 7R and 7L, respectively, for performing control loop adjustment in relation to the kinetic modes, respectively, whereby compensation signals $c_g$, $c\theta_x$ and $c\theta_y$ related to the position with respect to the kinetic modes, respectively, are produced. These compensation signals $c_g$, $c\theta_x$ and $c\theta_y$ related to the kinetic modes, respectively, are applied to the kinetic mode distributing circuit 10, whereby drive signals $d_M$, $d_R$ and $d_L$ for the respective axes are produced to drive power amplifiers 8M, 8R and 8L of current output type, respectively. Here, the arithmetical operation performed in the kinetic mode distributing circuit 10 is expressed by equation (6) below:

$$\begin{bmatrix} d_M \\ d_R \\ d_L \end{bmatrix} = \begin{bmatrix} 1 & 1 & 0 \\ 1 & -0.7071 & -1 \\ 1 & -0.7071 & 1 \end{bmatrix} \begin{bmatrix} c_g \\ c\theta_x \\ c\theta_y \end{bmatrix} \quad (6)$$

The feedback system when provided with the kinetic mode extracting circuit 9 and the kinetic mode distributing circuit 10 as described above, is called a non-interfering feedback system, in this specification. The combination of the fine-motion positioning mechanism and the non-interfering feedback system is called a fine-motion positioning non-interfering system, in this specification.

The arithmetical operations to be made in the kinetic mode extracting circuit 9 and the kinetic mode distributing circuit 10 are defined in this specification as expressed by equations (5) and (6) mentioned above. This is because: in FIG. 2 which shows the coordinates of the actuators 2M, 2R and 2L as well as those of the position sensors 3M, 3R and 3L, if the translational motion and the rotational motion along a plane are defined with respect to the origin of the coordinate system, equations (5) and (6) are derived. As a matter of course, translational motion and rotational motion may be defined with respect to a center which deviates from the coordinate origin shown in FIG. 2. In that case, equations (5) and (6) take different values, but the structure of the FIG. 1 itself is unchanged.

Next, a fine-motion positioning non-interfering control system according to the present invention will be explained in comparison with a conventional fine-motion positioning control system to clarify the effectiveness of the former.

Figure 3:
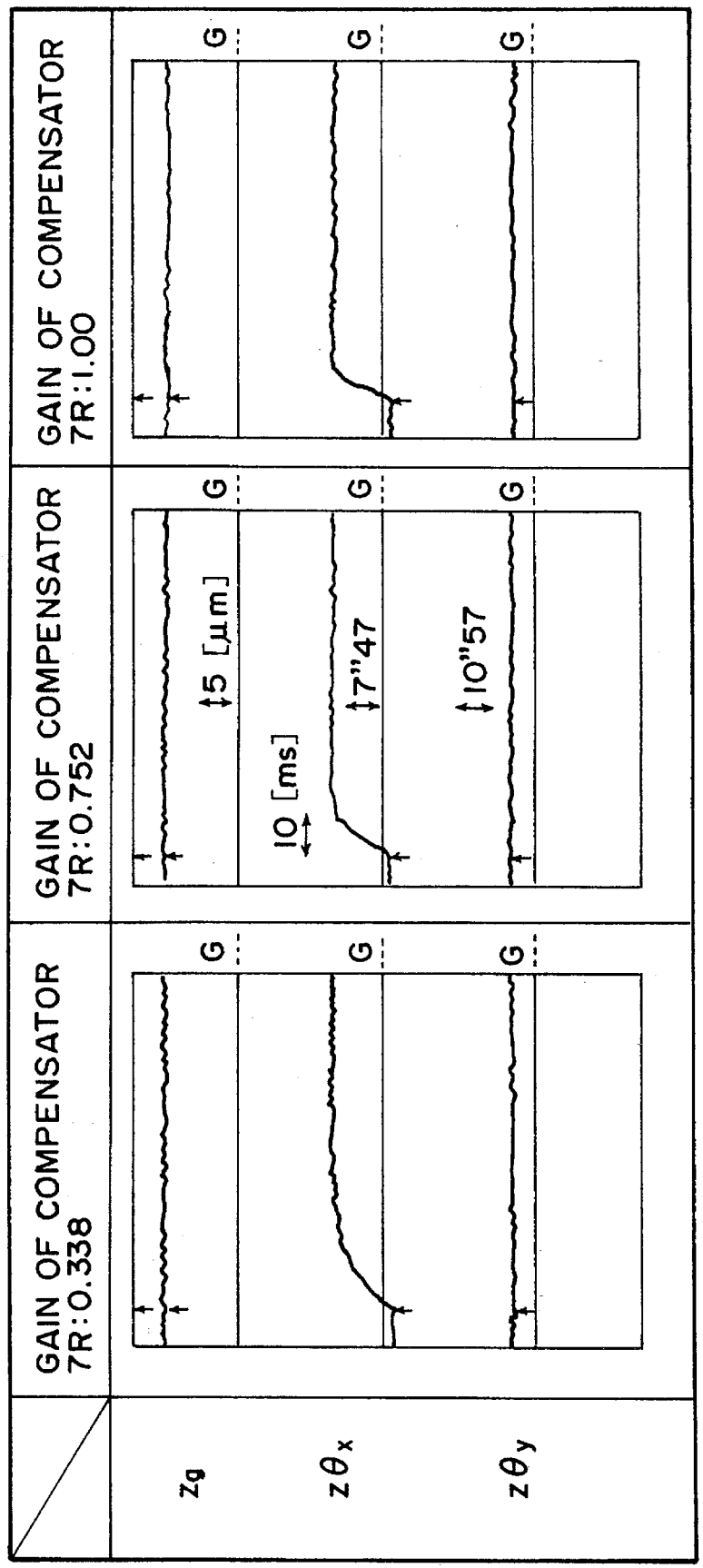
FIG. 3 is a schematic view, showing response wave forms during the gain adjustment in the system of the FIG. 1 embodiment.

FIG. 3 illustrates the response of the fine-motion positioning non-interfering control system at the time of gain adjustment. Referring to FIG. 1, kinetic mode displacement signals $z_g$, $z\theta_x$ and $z\theta_y$ as provided when the gain of the compensator 7R is enlarged while the gains of the compensators 7M and 7L are held fixed, are observed. First, it is seen that, with the increase of the gain of the compensator 7R, no overshooting is produced and the convergency is improved. Additionally, only the kinetic mode displacement signal $z\theta_x$ is adjustable without adversely affecting the kinetic mode displacement signals $z_g$ and $z\theta_y$.

Figure 4:
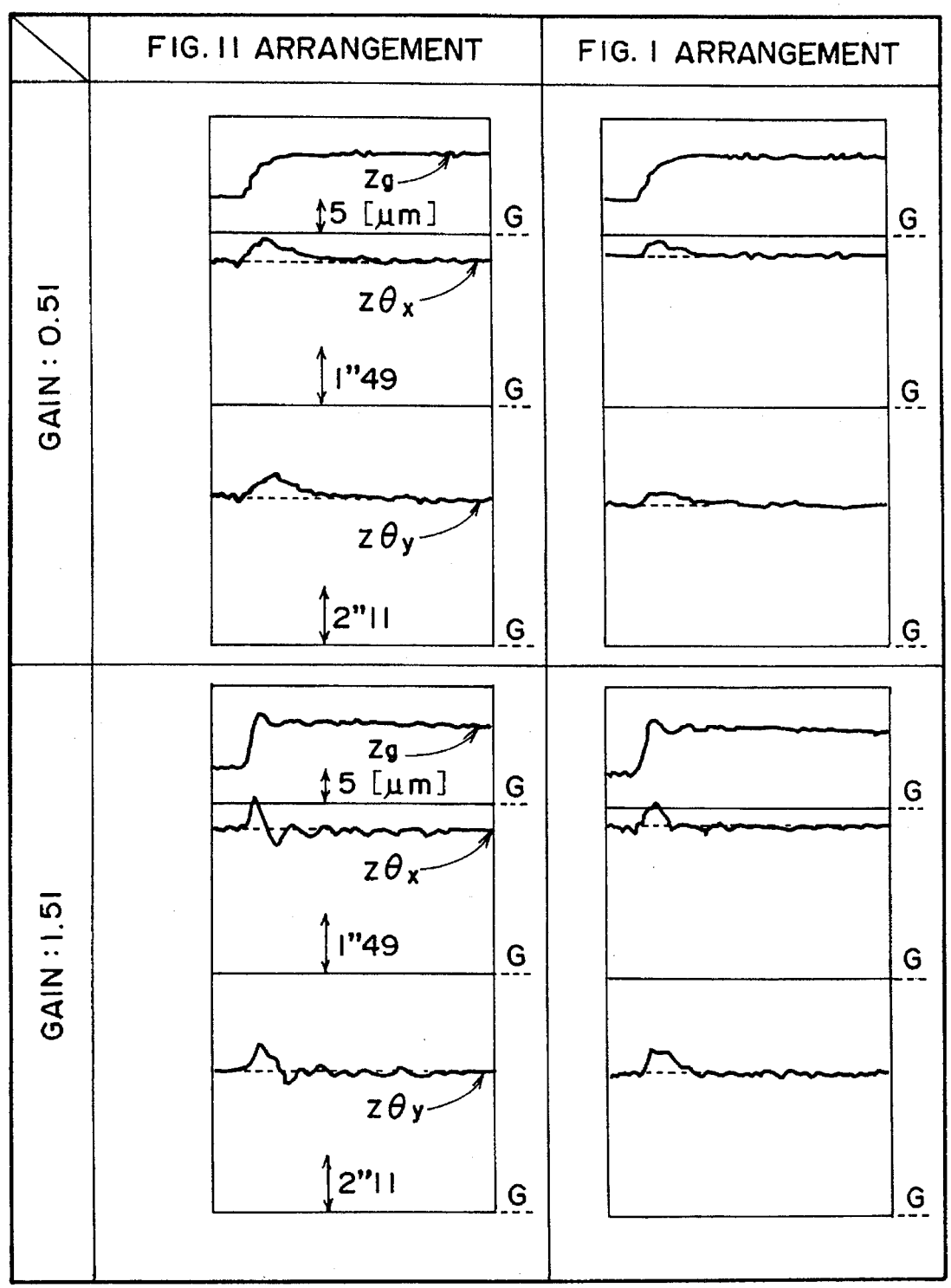
FIG. 4 is a schematic view, showing output wave forms from a kinetic mode extracting circuit, representing the freedom of gain adjustment in the system of the FIG. 1 embodiment.
Figure 13:
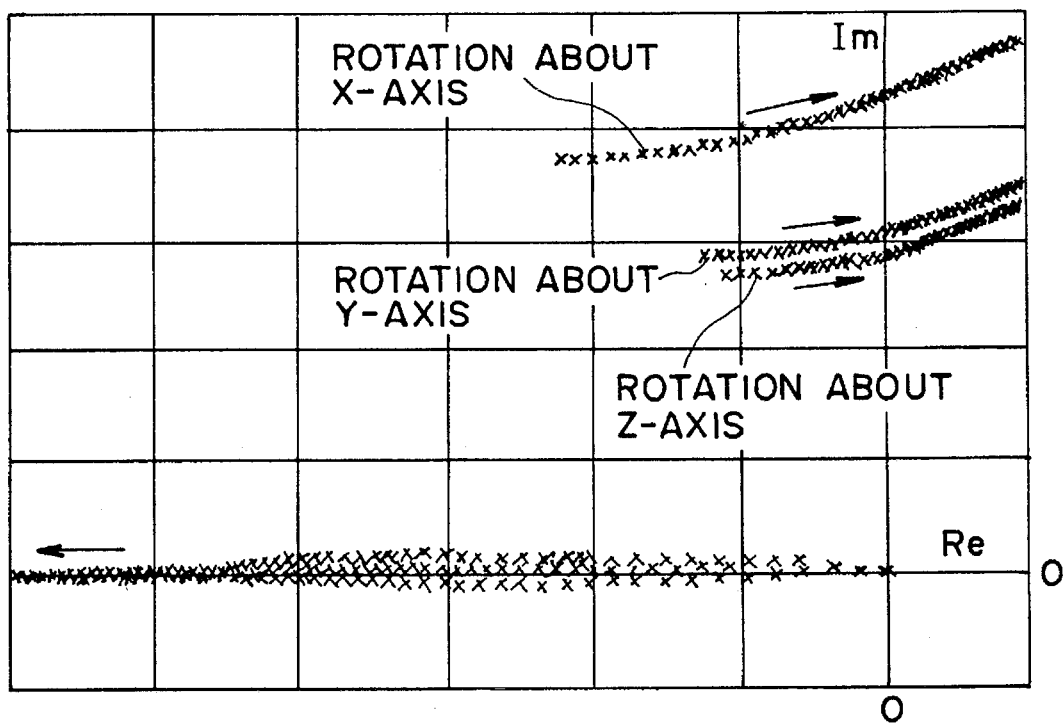
FIG. 13 is a schematic view, showing the root locus in a case where, in the positioning control system of FIG. 11, the gains of the compensators are enlarged.

FIG. 4 illustrates output waves of the kinetic mode extracting circuit 9, this being for explaining the gain adjustment freedom. With the fine-motion positioning non-interfering control system of the present invention, it is possible to set the control characteristics of the three kinetic modes, independently (to some degree). The left-hand portion of FIG. 4 corresponds to the gain adjustment in the fine-motion positioning control system of FIG. 11. With the gain increase which is the same with respect to all the three axes, the convergency of the kinetic mode displacement signal $z_g$ of the translational motion is improved. Here, in terms of FIG. 13, the complex conjugate point of the kinetic mode displacement signals $z\theta_x$ and $z\theta_y$ of rotational motion changes along the plane s to cause an increase of natural frequency and a damping decrease. Therefore, these responses would be a vibratory quick rise. From the results of experiment of FIG. 4, quick rise vibratory responses of $z\theta_x$ and $z\theta_y$ are confirmed. Here, if a further improvement of the convergency of the kinetic mode displacement signals $z\theta_x$ and $z\theta_y$ of rotational motion is desired, it is no more attainable because there is no freedom of gain adjustment left. Thus, the waveforms $z\theta_x$ and $z\theta_y$ of the kinetic mode displacement signals of rotational motion have to be left in the state shown in the lower left portion of FIG. 4.

With the fine-motion positioning non-interfering control system of the present invention, as compared therewith, the convergency of the kinetic mode displacement signal $z_g$ of translational motion can be improved only by the gain increase of the compensator 7M and, additionally, the waveforms of the kinetic mode displacement signals $z\theta_x$ and $z\theta_y$ of rotational motion can still be improved. Namely, it is possible to manipulate the gains so as to provide further amplification suppression of the kinetic mode displacement signals $z\theta_x$ and $z\theta_y$, from the state shown with the lower right portion of FIG. 4. That is, in regard to $z\theta_x$, the convergency can be improved by manipulating the compensator 7R while, with regard to $z\theta_y$, the convergency can be improved by manipulating the compensator 7L.

In the embodiment of FIG. 1, a fine-motion positioning mechanism having three-axis degrees of freedom, that is, one degree of freedom in a vertical direction and two degrees of freedom at an incline along a horizontal plane, is adopted. However, as regards the number of axes, the present invention is not limited to the described embodiment. It is applicable also to any other multi-axis fine-motion positioning mechanism. Also, while in the embodiment of FIG. 1 the control system comprises an analogue operation circuit, a portion of the same or the whole of the same may be replaced by a digital operation circuit such as an electronic computer.

To the fine-motion positioning mechanism, the first embodiment of the present invention may be described as follows.

To a fine-motion positioning mechanism which comprises a flat substrate to be positioned, actuators for moving the substrate and position sensors for measuring the movement distance of the substrate, the first embodiment comprises a non-interference feedback system which includes: displacement amplifier means for transforming outputs of position sensors into electrical signals, kinetic mode extracting circuit means for extracting kinetic modes of a substrate from the outputs of the displacement amplifier means, differential amplifier means for comparing the outputs of the kinetic mode extracting circuit means with voltages applied to command voltage input terminals to produce kinetic mode differential signals to thereby provide a predetermined sensitivity to the kinetic mode differential signals, compensator means for performing gain adjustment to the outputs of the differential amplifier means, kinetic mode distributing circuit means responsive to an input signal (output of the compensator means) to produce a drive signal to actuator means, and current output type power amplifier means for driving the actuator means in response to the drive signal.

Second Embodiment

The first embodiment shown in FIG. 1 uses current output type power amplifiers 8M, 8R and 8L for drive of the actuators 2M, 2R and 2L which comprises piezoelectric devices, for example. The reason for the use of such current output type power amplifiers is because of an advantage that, as has been indicated by equation (4), while there is a primary delay of response of the whole system to a target value $z_0$, the loop gain adjustment allows a desired adjustment of response without overshooting.

However, it is unusual to use current output type power amplifiers 8M, 8R and 8L of the actuators 2M, 2R and 2L comprising piezoelectric devices and, generally, voltage output type power amplifiers are used. Apparently, this is for the following reason. In a case where a piezoelectric device is driven by use of a current output type power amplifier, an integration characteristic such as shown by equation (2) is provided, such that the system is not asymptotically stable. Namely, if a constant input voltage is applied to a current output type power amplifier without closing the loop of the control system, the opposite end voltages of the piezoelectric increase with time. On the other hand, if a voltage output type power amplifier is used to drive a piezoelectric device, its transfer function has a primary delay characteristic and an asymptotically stable system is provided. Therefore, if it is desired to measure the characteristic of the piezoelectric device itself to check the function thereof, before closing the loop of the control system, use of a voltage output type power amplifier is convenient.

Now, an example where a voltage output type power amplifier is used to drive a piezoelectric device, will be explained as a second embodiment of the present invention.

Figure 5:
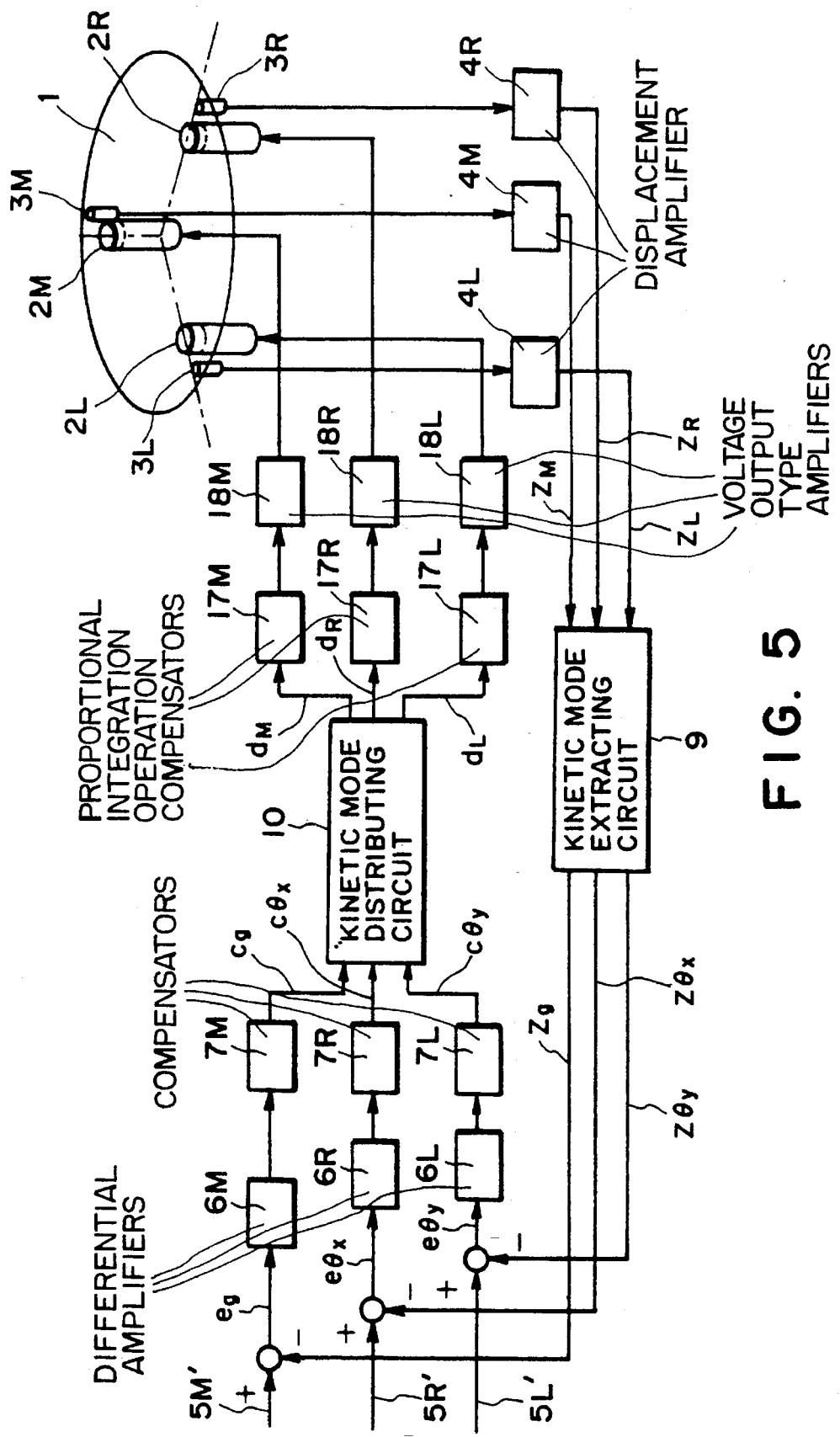
FIG. 5 is a block diagram of a fine-motion positioning non-interfering control system according to a second embodiment of the present invention.

Referring to FIG. 5, denoted at 17M, 17R and 17L are PI compensators, and denoted at 18M, 18R and 18L are voltage output type power amplifiers. Here, "P" means "proportional" and "I" means "integration operation". Like numerals as of those FIG. 1 are assigned to corresponding elements.

Figure 6:
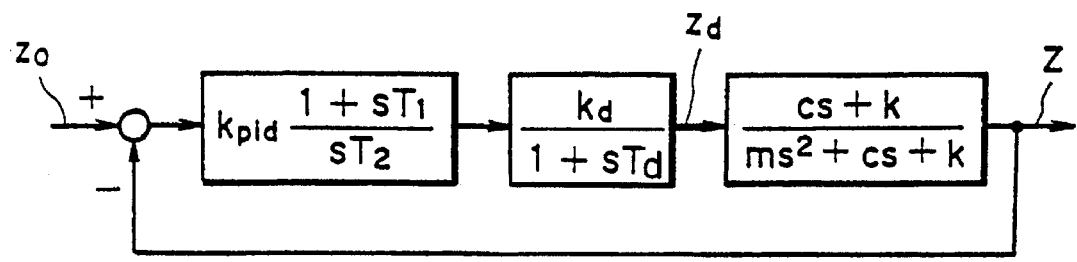
FIG. 6 is a position controlling block diagram of a single axis positioning mechanism as driven by a voltage output type power amplifier.

Here, in order that the structure of FIG. 5 functions in an equivalent manner to that of FIG. 1, the parameters of the PI compensators 17M, 17R and 17L should be set carefully. Referring to FIG. 6, an explanation will be made by use of a single axis positioning mechanism, for ease in understanding. When a single axis positioning mechanism as given by equation (1) is driven by a voltage output type power amplifier 18, the transfer function thereof is given by equation (7) below:

$$\{k_d/(1+sT_d)\} \cdot \{(cs+k)/(ms^2+cs+k)\} \tag{7}$$

wherein $k_d$ is gain and $T_d$ is delay constant.

Subsequently, the transfer function of the PI compensator 17 is set by equation (8) below:

$$k_{pid}\{(1+sT_1)/sT_2\} \tag{8}$$

The transfer function of a cascade connection of equations (7) and (8) is given by equation (9) below:

$$\{k_{pid}(1+sT_1)/sT_2\} \cdot \{k_d/(1+sT_d)\} \cdot \{(cs+k)/(ms^2+cs+k)\} \tag{9}$$

Here, a numerator time constant of the PI compensator 17 substantially the same as the time delay constant $T_d$ of the voltage output type power amplifier, is selected. That is, the zero point of the PI compensator 17 and the pole of the voltage output type power amplifier 18 are canceled. Here, the transfer function of equation (9) is expressed by equation (10) below:

$$\{k_{pid}(k_d/sT_2)\} \cdot \{(cs+k)/(ms^2+cs+k)\} \tag{10}$$

Thus, equation (10) is equivalent to equation (2). Here, the transfer function of the closed loop has a primary delay, and the response of the system can be adjusted as desired through the loop gain adjustment. It is thus equivalent to a case where a current output type power amplifier 8 is used to drive a piezoelectric device. Therefore, to a fine-motion positioning mechanism, the second embodiment of the present invention may be described as follows:

To a fine-motion positioning mechanism which includes a flat substrate to be positioned, actuators for moving the substrate and position sensors for measuring the movement distance of the substrate, the second embodiment provides a fine-motion positioning non-interfering control system with a non-interfering feedback system which comprises: displacement amplifier means for transforming an output of position sensor means into an electrical signal, kinetic mode extracting circuit means for extracting kinetic modes of a substrate on the basis of the output of the displacement amplifier means, differential amplifier means for comparing the output of the kinetic mode extracting circuit means with a voltage applied to a command voltage input terminal to produce a kinetic mode differential signal and to provide the kinetic mode differential signal with a predetermined sensitivity, and PI compensator means for performing compensation to the output of the differential amplifier, kinetic mode distributing circuit means responsive to the output of the PI compensator means as an input to produce a drive signal for actuator means, and voltage output type power amplifier means responsive to the drive signal to drive the actuator means, wherein the system is so set that the zero point of the transfer function of the PI compensator means and the pole of the transfer function of the voltage output type power amplifier are mutually canceled.

Third Embodiment

Figure 7:
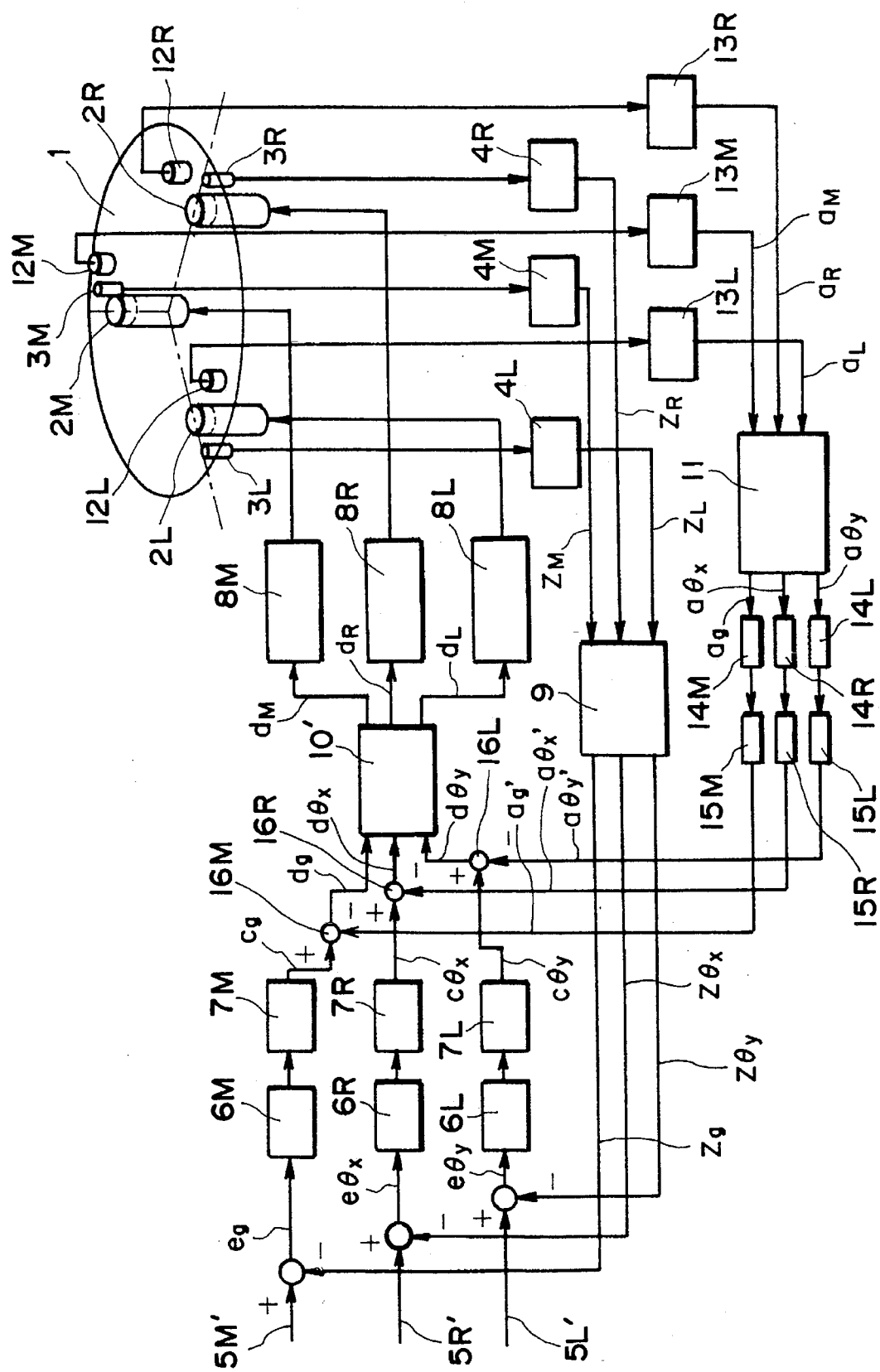
FIG. 7 is a block diagram of a fine-motion positioning non-interfering control system according to a third embodiment of the present invention.

FIG. 7 is a block diagram of a fine-motion positioning dynamic non-interfering control system according to a third embodiment of the present invention. Details of the operation of it will be explained in conjunction with the drawing.

The control device of FIG. 7 may be equivalent to the structure of FIG. 1 with the addition of acceleration sensors 12M, 12R and 12L, acceleration amplifiers 13M, 13R and 13L, a second kinetic mode extracting circuit 11 (kinetic mode extracting circuit to an acceleration signal), filter circuits 14M, 14R and 14L, gain circuits 15M, 15R and 15L, and adders 16M, 16R and 16L for adding the outputs of the gain circuits 15M, 15R and 15L and the outputs of compensators 7M, 7R and 7L and for supplying the results to a kinetic mode distributing circuit 10, in substitution for the outputs of the compensators 7M, 7R and 7L. Like numerals as of those of FIG. 1 are assigned to the elements corresponding to the elements of the first embodiment and having similar functions.

Displacement of the substrate 1 in the vertical (z-axis) direction as measured by the position sensors 3M, 3R and 3L is transformed by displacement amplifiers 4M, 4R and 4L into electrical signals $z_M$, $z_R$ and $z_L$. These electrical signals are applied to a first kinetic mode extracting circuit 9 (kinetic mode extracting circuit related to the position), whereby kinetic mode displacement signals $z_g$, $z\theta_x$ and $z\theta_y$ are produced. The arithmetic operation of the kinetic mode extracting circuit 9 is given by equation (5) mentioned hereinbefore. These kinetic mode displacement signals $z_g$, $z\theta_x$ and $z\theta_y$ are compared with the voltages applied to command voltage input terminals 5M', 5R' and 5L', and kinetic mode differential signals $e_g$, $e\theta_x$ and $e\theta_y$ are produced. In order to get a predetermined sensitivity, these differential signals are applied to differential amplifiers 6M, 6R and 6L. Further, outputs of the differential amplifiers 6M, 6R and 6L are applied to the compensators 7M, 7R and 7L which serve to perform control loop adjustment in relation to the kinetic modes, separately, such that compensation signals $c_g$, $c\theta_x$ and $c\theta_y$ in the respective kinetic modes and related to the position signals are produced. These compensation signals $c_g$, $c\theta_x$ and $c\theta_y$ of respective kinetic modes and related to the position signals, are applied to the addition terminals of the adders 16M, 16R and 16L.

On the other hand, outputs of the acceleration sensors 12M, 12R and 12L are transformed by the acceleration amplifiers 13M, 13R and 13L into electrical signals $a_M$, $a_R$ and $a_L$. These electrical signals are then applied to the kinetic mode extracting circuit 11 to produce the acceleration signal (i.e., the second kinetic mode extracting circuit), so that acceleration signals $a_g$, $a\theta_x$ and $a\theta_y$ related to the respective kinetic modes, separately, are produced. Also, the arithmetic operation of the kinetic mode extracting circuit to the acceleration signal, is performed in accordance with equation (5). Namely, equation (11) below results:

$$\begin{bmatrix} a_g \\ a\theta_x \\ a\theta_y \end{bmatrix} = \begin{bmatrix} 0.4142 & 0.2929 & 0.2929 \\ 0.5858 & -0.2929 & -0.2929 \\ 0 & -0.5 & 0.5 \end{bmatrix} \begin{bmatrix} a_M \\ a_R \\ a_L \end{bmatrix} \quad (11)$$

These acceleration signals $a_g$, $a\theta_x$ and $a\theta_y$ of respective kinetic modes are filtered appropriately by the filter circuits 14M, 14R and 14L. Then, they are gain adjusted through the gain circuits 15M, 15R and 15L, such that acceleration negative feedback signals $a_g'$, $a\theta_x'$ and $a\theta_y'$ related to the respective kinetic modes, separately, are produced. These negative feedback signals are applied to subtraction terminals of the adders 16M, 16R and 16L and they are calculated with compensation signals $c_g$, $c\theta_x$ and $c\theta_y$ of respective kinetic modes, related to the position, as outputted from the compensators 7M, 7R and 7L, respectively, such that compensation signals $d_g$, $d\theta_x$ and $d\theta_y$ related to the respective kinetic modes, separately, are produced. Finally, these compensation signals $d_g$, $d\theta_x$ and $d\theta_y$ related to the respective kinetic modes, are applied to the kinetic mode distributing circuit 10, whereby drive signals $d_M$, $d_R$ and $d_L$ for the respective axes are produced to drive the current output type power amplifiers 8M, 8R and 8L, respectively. Here, the arithmetic operation of the kinetic mode distributing circuit 10 is expressed by equation (12), below, similar to equation (6):

$$\begin{bmatrix} d_M \\ d_R \\ d_L \end{bmatrix} = \begin{bmatrix} 1 & 1 & 0 \\ 1 & -0.7071 & -1 \\ 1 & -0.7071 & 1 \end{bmatrix} \begin{bmatrix} d_g \\ d\theta_x \\ d\theta_y \end{bmatrix} \quad (12)$$

A conventional feedback system when combined with the kinetic mode extracting circuit 9 (first kinetic mode extracting circuit) to produce a position signal, and the kinetic mode extracting circuit 11 (second kinetic mode extracting circuit) to produce an acceleration signal as well as the kinetic mode distributing circuit 10, as described above, is called an acceleration feedback non-interfering system, in this specification. A fine positioning mechanism when combined with this acceleration feedback non-interfering system is called a fine-motion positioning dynamic non-interfering system, in this specification.

Figure 8:
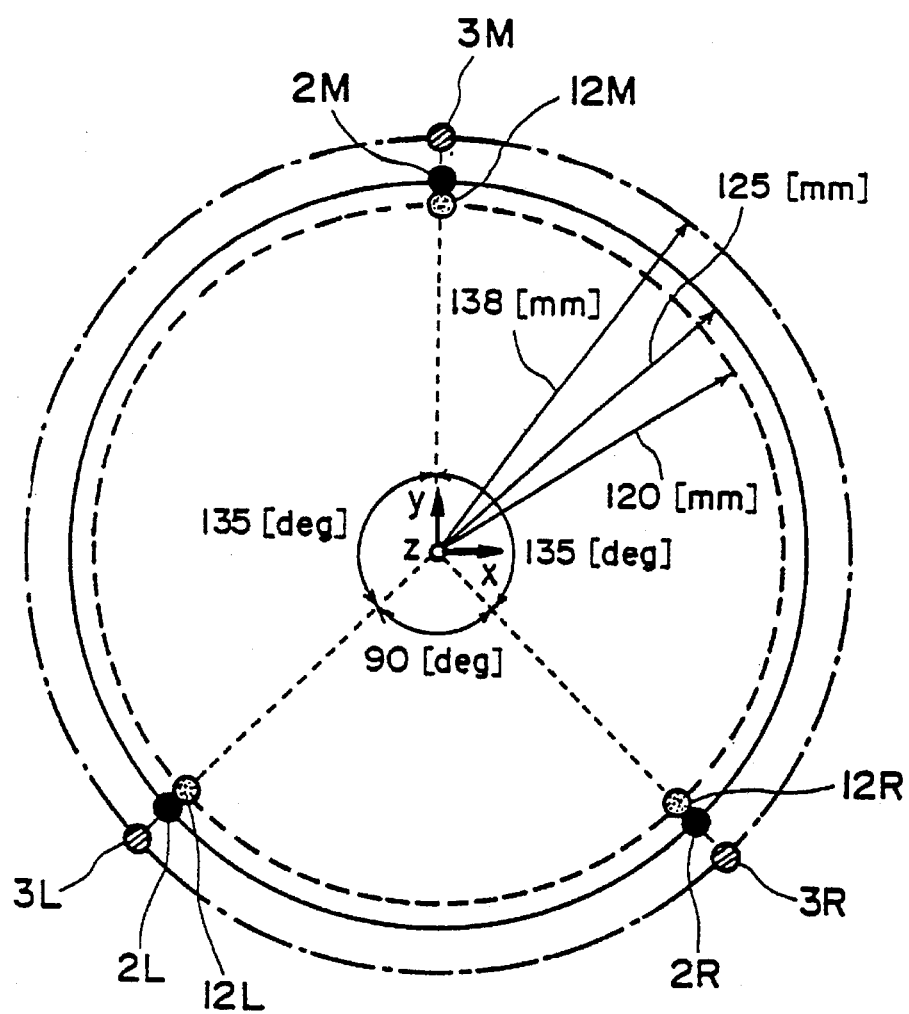
FIG. 8 is a schematic view of coordinates of actuators, position sensors and acceleration sensors used in the system of the FIG. 7 embodiment.

The arithmetical operations to be performed in the kinetic mode extracting circuit 9 to produce a position signal, the kinetic mode extracting circuit to produce an acceleration signal and the kinetic mode distributing circuit 10 are defined in this specification as expressed by equations (5), (11) and (12) mentioned above. This is clear from FIG. 8. In FIG. 8 which shows the coordinates of the actuators 2M, 2R and 2L, the position sensors 3M, 3R and 3L as well as the acceleration sensors 12M, 12R and 12L, if translational motion (in the z-axis direction) and rotational motion (rotation about the x-axis and rotation about the y-axis) along a plane are defined with respect to the origin of the coordinate system, equations (5), (11) and (12) are derived. As a matter of course, translational motion and rotational motion may be defined with respect to a center which deviates from the coordinate origin shown in FIG. 8. In that case, equations (5), (11) and (12) take different values, but the structure of the FIG. 7 itself is unchanged. Further, what is illustrated in FIG. 8 is a particular example wherein paired actuators, position sensors and acceleration sensors are disposed at the same radius. If these elements are disposed close to each other, which may be an ordinary case, the structure of FIG. 7 may still be held unchanged. Furthermore, the invention is applicable also to a case wherein actuators, position sensors and acceleration sensors are not in a one-to-one relationship, namely, in a case where the number of the actuators is not the same as that of the position sensors or the acceleration sensors, for example.

Next, the effectiveness to be provided when a fine-motion positioning dynamic non-interfering control system of the present invention is used, will be explained in conjunction with the results of experiments.

Figure 9A:
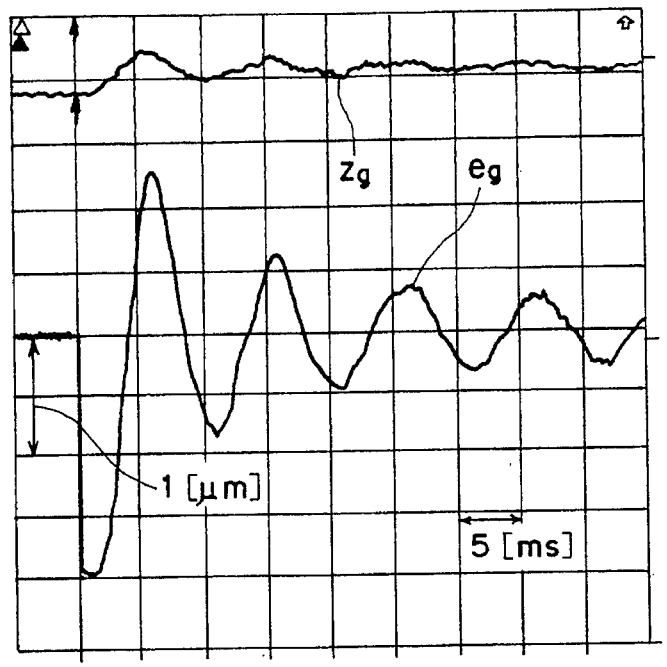
FIGS. 9A and 9B are wave form views for explaining the difference in step response between the cases with no acceleration feedback and with acceleration feedback.
Figure 9B:
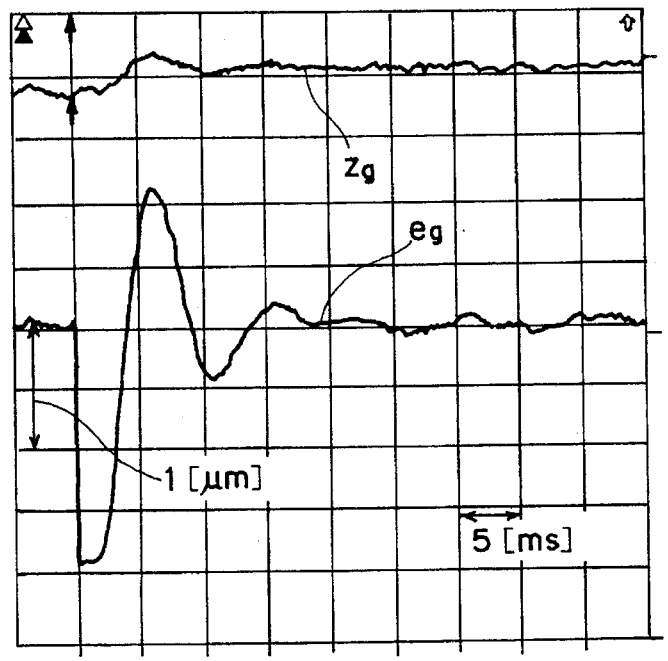

FIGS. 9A and 9B are graphs, for comparing the difference in the response to a translational step motion command between a case with acceleration feedback and a case without the same. Specifically, these graphs are the result of observation wherein, in FIG. 7, while a step voltage is applied only to the command voltage input 5M', the effects to the kinetic mode displacement signal $z_g$ and the kinetic mode differential signal $e_g$ with and without a translational motion acceleration feedback signal $a_g'$, are observed. FIG. 9A corresponds to a case without acceleration feedback, and FIG. 9B corresponds to a case with acceleration feedback. It is seen from these drawings that, with the addition of the acceleration feedback, the vibratory response in FIG. 9A is suppressed as depicted in FIG. 9B. What the results of this experiment show is important. Namely, with the application of the acceleration feedback, it is possible to suppress vibration such as from the state shown in FIG. 9A to the state shown in FIG. 9B. This means that, from the state shown in FIG. 9B, it is possible to further increase the gain of the compensator 7M. That is, the acceleration feedback enables application of additional damping and, as a result, a higher loop gain can be set as compared with a case without such additional damping. It is therefore possible to provide a quick response as well as enhanced performance for suppressing external disturbance. Further, the amount of acceleration feedback can be adjusted independently through the gain circuits 15M, 15R and 15L, in relation to each kinetic mode, and it is possible to adjust the degree of damping application with respect to each kinetic mode and to adjust the position loop in each kinetic mode independently through the gain adjustment by the compensators 7M, 7R and 7L, respectively.

Figure 11:
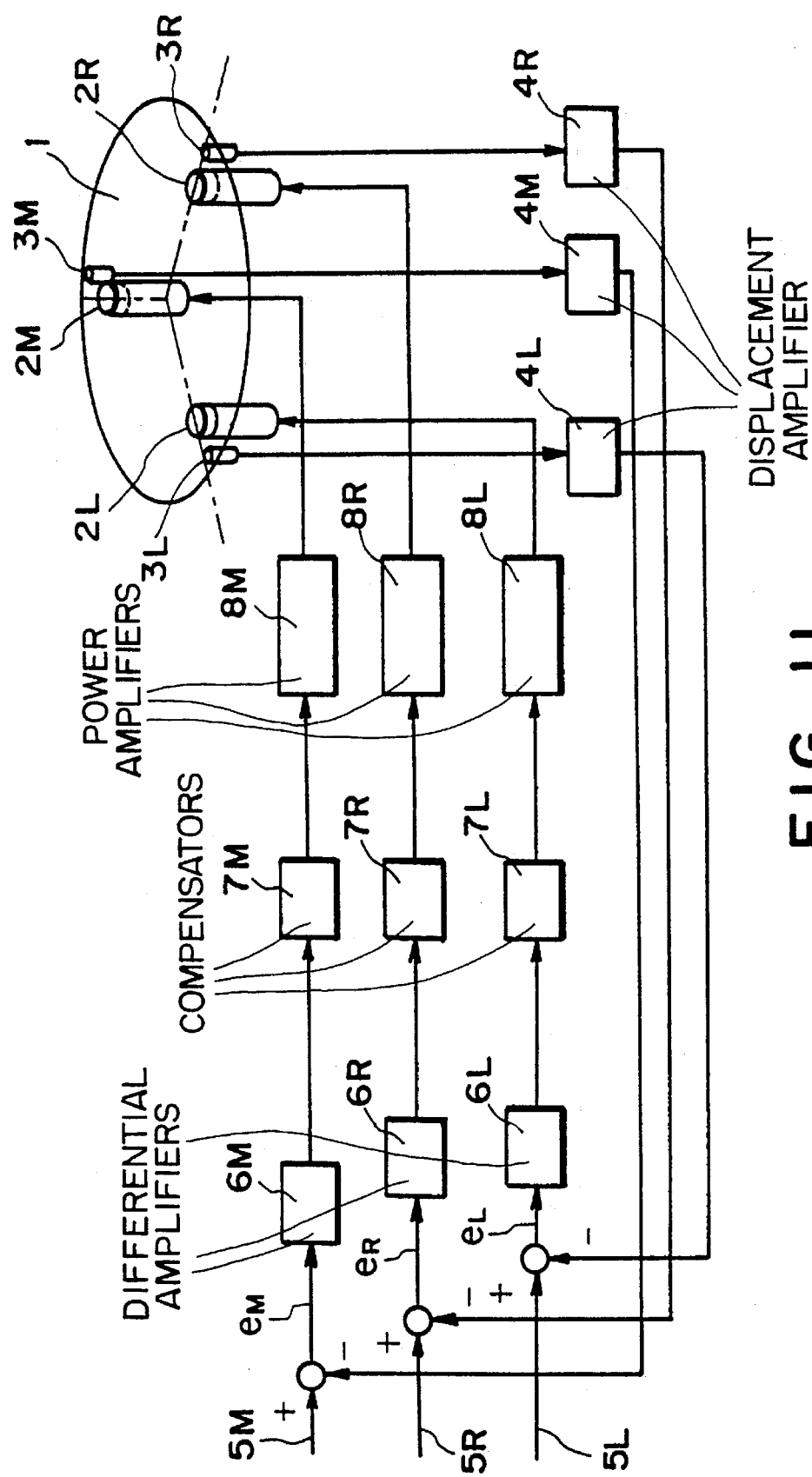
FIG. 11 is a block diagram of a known type fine-motion positioning control system.
Figure 12:
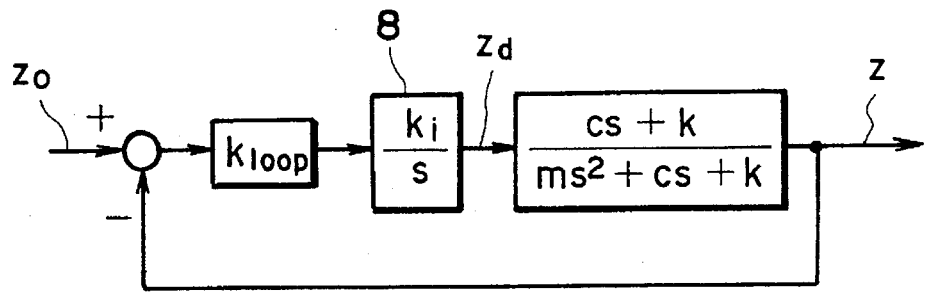
FIG. 12 is a position control block diagram of a single axis positioning mechanism as driven by a current output type power amplifier.

Since in this embodiment the amount of damping application can be adjusted in each kinetic mode with the acceleration feedback and, additionally, the response related to the position can be adjusted in each kinetic mode, the inconveniences described with reference to the fine-motion positioning control system of FIG. 11 are avoided.

Fourth Embodiment

Figure 10:
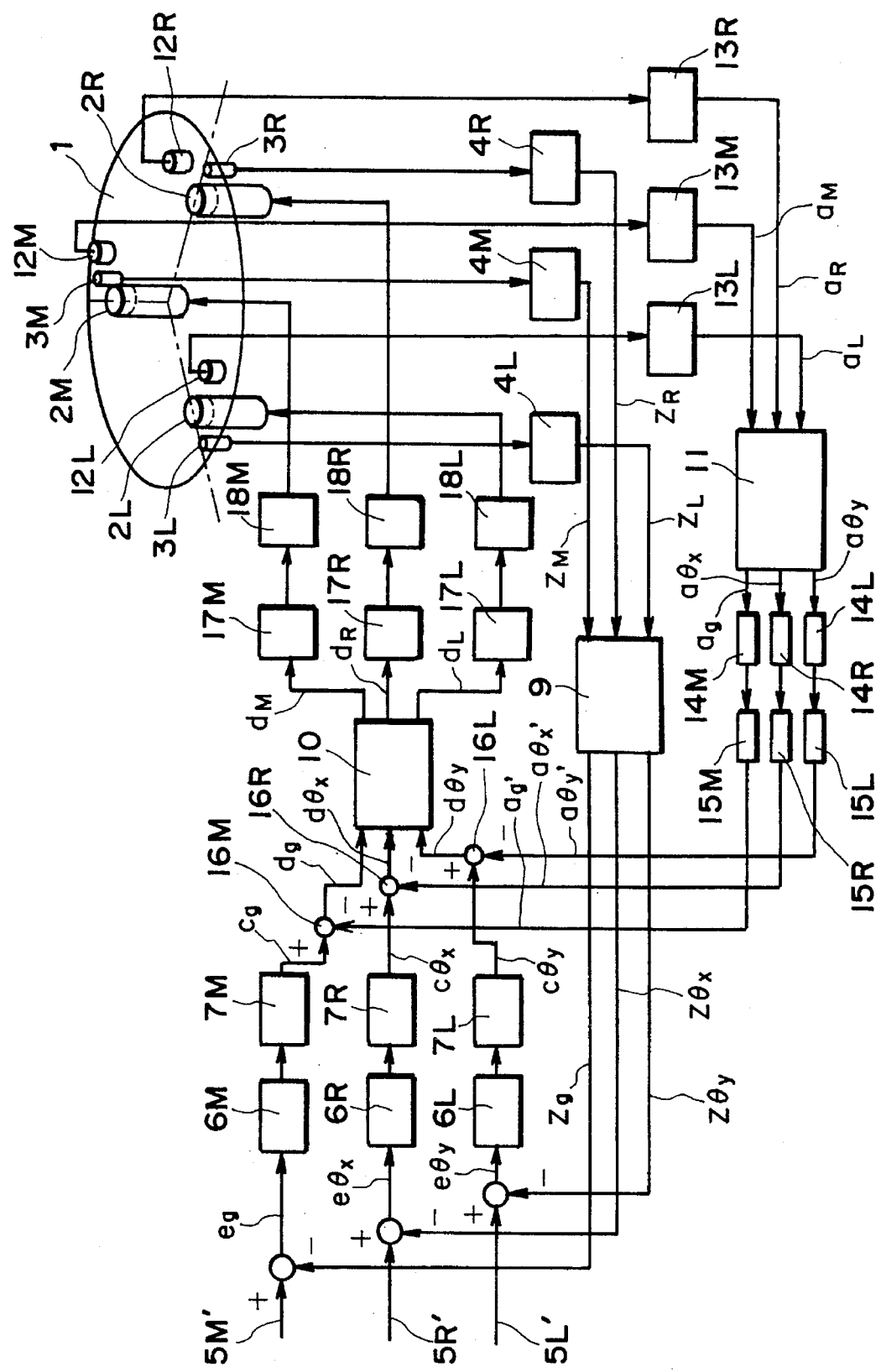
FIG. 10 is a block diagram of a fine-motion positioning non-interfering control system according to a fourth embodiment of the present invention.

In the third embodiment shown in FIG. 7, use of the current output type power amplifiers 8M, 8R and 8L is important. Namely, the output signals of the acceleration sensors 12M, 12R and 12L are filtered appropriately and, thereafter, they are fed back and applied through the current output type power amplifiers, in which case the amount of operation functions as the damping. In the present invention, however, it is possible to use a voltage output type power amplifier in place of a current output type one. FIG. 10 shows the structure of a fine-motion positioning dynamic non-interfering control system according to a fourth embodiment of the present invention which uses voltage output type power amplifiers. The system of FIG. 10 differs from that of FIG. 7 in that it uses voltage output type power amplifiers 18M, 18R and 18L in place of the current output type power amplifiers 8M, 8R and 8L, and in that it is provided with PI compensators 17M, 17R and 17L. The reason for use of the PI compensators 17M, 17R and 17L is as follows:

Generally, the transfer function of voltage output type power amplifier 18M, 18R or 18L is expressed as a primary delay system such as by equation (13) below:

$$k_d/(1+sT_d) \qquad (13)$$

wherein $T_d$ is a delay time constant, and $k_d$ is the gain. Also, the transfer function of the PI compensator 17M, 17R or 17L is expressed by equation (14) below:

$$k_{pi}\{(1+sT_1)/sT_2\} \qquad (14)$$

wherein $k_{pi}$ is the gain of the PI compensator, $T_1$ is a numerator time constant, and $T_2$ is a denominator time constant. Here, if the numerator time constant $T_1$ of the PI compensator 17M, 17R or 17L is so adjusted to satisfy the relation $T_d=T_1$, the transfer function of cascade connection of the compensator and amplifier 17M and 18M (17R and 18R; 17L and 18L) becomes equivalent to the transfer function to be provided when the current output type power amplifier 8M, 8R or 8L is used. Thus, by connecting the PI compensators 17M, 17R and 17L of respective axes and the voltage output type power amplifiers 18M, 18R and 18L to the downstream side of the kinetic mode distributing circuit 10, in place of the current output type power amplifiers 8M, 8R and 8L, it is possible to provide a fine-motion positioning dynamic non-interfering control system with voltage output type power amplifiers, which is equivalent to that of FIG. 7.

Fifth Embodiment

The third and fourth embodiments described above are of the structure that acceleration sensors 12M, 12R and 12L are provided and the output signals of them are applied to kinetic mode extracting circuit 11 for damping application in each of the kinetic mode, independently. However, these acceleration sensors 12M, 12R and 12L may be replaced by appropriate speed sensor means. The structure of the fine-motion positioning dynamic non-interference control system in that case is similar to that of FIG. 10. It is however necessary that the acceleration sensors 12M, 12R and 12L are replaced by appropriate speed sensor means, and that the delay time constant $T_d$ of the voltage output type power amplifiers 18M, 18R and 18L as expressed by equation (13) is sufficiently small.

Modified Form of Embodiment

The third to fifth embodiments described above are all related to a three-axis fine-motion positioning mechanism.

However, the structure of the acceleration feedback non-interfering system according to the present invention is not limited to use in such mechanism. The structure of the acceleration feedback non-interfering system is applicable also to a multi-axis fine-motion positioning mechanism having a larger number of degrees of freedom. Namely, it is a possible alternative form that a multi-axis fine-motion positioning mechanism and an acceleration feedback non-interfering control system when combined provide a multi-axis fine motion positioning dynamic non-interfering control system. For example, for a four-axis fine-motion positioning mechanism, an acceleration feedback non-interfering system having a four-input and four-output kinetic mode extracting circuit to produce a position signal, a four-input and four-output kinetic mode extracting circuit to produce an acceleration signal, and a four-input and four-output kinetic mode distributing circuit, may be provided.

Further, although the embodiments of FIGS. 1, 5 and 10 includes a control system which comprises an analogue operational circuit, a portion of or the whole of the same may be replaced by a digital operational device such as an electronic computer.

Further, while in FIGS. 7 and 10, the kinetic mode extracting circuit 11 and the filter circuits 14M, 14R and 14L as well as the gain circuits 15M, 15R and 15L are disposed separate from each other, it is within the scope of the present invention that the functions of these components are concentrated within and provided by the kinetic mode extracting circuit 11. Further, as regards the function of the filter circuits 14M, 14R and 14L, while in the above description it has been referred to as having an appropriate filtering function, it may include a low-pass filter for cutting an offset voltage to be produced in an output signal of the acceleration amplifier 13M, 13R or 13L, and/or a low-pass filter for cancelling the zero point of the numerator in the transfer function of equation (1).

In a fine-motion positioning non-interfering control system according to the present invention, as has been described hereinbefore, the loop gain can be adjusted with respect to each of the kinetic modes of the substrate. In a conventional fine-motion positioning control system, only the adjustment of the loop gain to translational motion in the z-axis direction is allowed. With the present invention, as compared therewith, there is an advantage that the control characteristic can be improved as much as possible through the addition of the increase in the freedom of adjustment. Moreover, no overshooting is produced by the loop gain adjustment. Thus, there is an additional advantage that no additional load is applied to the fine-motion positioning mechanism. Further, as a result of the capability of the adjustment of increasing the loop gain in each kinetic mode as much as possible, not only the response characteristic to a command signal is improved but also the external disturbance suppressing performance is improved as compared with that of a conventional positioning system.

Next, advantageous effects of the use of a fine-motion positioning non-interfering control system as viewed from the point of command signal input, will be explained. The fine-motion positioning non-interfering control system shown in FIG. 1 may be used in a semiconductor exposure apparatus, for example. In that case, a semiconductor wafer is placed on the substrate 1. In this case, the voltage level to be applied to the command voltage input terminals 5M', 5R' and 5L' of the fine-motion positioning non-interfering control system is calculated on the basis of a measured value obtained through detection of the attitude of the surface of the semiconductor wafer. Usually, this measured value is based on a translational component of the semiconductor wafer and two inclination components of the same along a plane. Thus, in the case of the fine-motion positioning control system as shown in FIG. 11, the voltages to be applied to the command voltage input terminals 5M, 5R and 5L would be calculated with coordinates conversion into the measured value representing the wafer translation and rotation along the plane.

On the other hand, in the case of a fine-motion positioning non-interfering control system according to the present invention, the control loop itself is based on the kinetic modes of translation and rotation. Therefore, without coordinate conversion, the measured value of the attitude of the semiconductor wafer surface directly corresponds to the voltage to be applied to the command voltage input terminal 5M', 5R' or 5L' of the fine-motion positioning non-interfering control system. The attitude measurement to the semiconductor wafer surface and coordinates conversion therefor takes a long time. If therefore, the closed loop frequency characteristic of the fine-motion positioning control system can be enhanced, prolonged time for application of command voltage obstructs the reduction in the positioning time. With the fine-motion positioning non-interfering control system according to any one of the preceding embodiments, there is an advantage that, by an amount corresponding to omission of the necessity of coordinates conversion to the measured attitude of the semiconductor wafer surface, the time required for the application of command voltages and the execution of the positioning operation can be reduced. Thus, the throughput is increased and the productivity is enhanced.

Further, with a fine-motion positioning dynamic non-interfering control system according to some embodiments of the present invention which include a kinetic mode extracting circuit to produce a position signal and a kinetic mode extracting circuit to produce an acceleration signal, performance adjustment can be done with respect to each of the kinetic modes. For example, in each of the kinetic modes related to one degree of freedom in the vertical direction and to two degrees of freedom of inclination in a horizontal plane, the positioning performance can be improved as much as possible, independently of the others. Particularly, because the system is provided with acceleration feedback based on the kinetic mode, the limit to stability due to insufficiency of rigidity of the fine-motion mechanism itself can be compensated for and a high loop gain can be set to reduce the positioning time. Also, there is an advantage that, with a high loop gain, the suppressing external disturbance is enhanced.

While the invention has been described with reference to the structures disclosed herein, it is not confined to the details set forth and this application is intended to cover such modifications or changes as may come within the purposes of the improvements or the scope of the following claims.

What is claimed is:

1. A position control system, comprising:

a plurality of actuators for moving an object;

a plurality of sensors for detecting the state of the object;

a first circuit for extracting a state signal, in each of different kinetic modes related to the object, from outputs of said sensors;

a compensating circuit for compensating for the state signals in the respective kinetic modes;

a second circuit for distributing an output of said compensating circuit and for providing drive signals for said actuators in accordance therewith; and a driver for driving said actuators in response to the drive signals.

2. A system according to claim 1, wherein at least one of said sensors includes a position sensor.

3. A system according to claim 1, wherein at least one of said sensors includes an acceleration sensor.

4. A system according to claim 1, wherein the object comprises a flat substrate.

5. A system according to claim 4, wherein the number of the kinetic modes is three and wherein the kinetic modes include one translational motion in a vertical direction along the surface of the object and rotational motion in two directions along the surface of the object.

6. A system according to claim 1, wherein the number of said actuators is three, and wherein the number of said sensors is three.

7. A system according to claim 1, wherein said compensating circuit includes a circuit for producing a differential signal between the state signal in each of the kinetic modes and a command.

8. A system according to claim 7, wherein said compensating circuit includes a circuit for performing gain adjustment to an output of an amplifier for amplifying the differential signal.

9. A system according to claim 7, wherein said compensating circuit includes a proportional integration operation compensator for performing proportional integration and gain adjustment to an output of an amplifier for amplifying the differential signal.

10. A system according to claim 1, wherein said driver includes a power amplifier.

* * * * *

UNITED STATES PATENT AND TRADEMARK OFFICE
CERTIFICATE OF CORRECTION

PATENT NO. : 5,568,032          Page 1 of 2
DATED      : October 22, 1996
INVENTOR(S) : SHINJI WAKUI It is certified that error appears in the above-indentified patent and that said Letters Patent is hereby corrected as shown below:

COLUMN 1

Line 14, "a ultra" should read --an ultra--.
      Line 23, "freedoms" should read --freedoms of movement--.

COLUMN 2

Line 2, "dynamical" should read --dynamic--.

COLUMN 3

Line 8, "involves" should read --involve--.
      Line 19, "depicts" should read --depict--.
      Line 53, "of" should be deleted.

COLUMN 7

Line 2, "experiment" should read --the experiment--.
      Line 19, "with" should read --in--.
      Line 20, "in" should read --with--.

UNITED STATES PATENT AND TRADEMARK OFFICE
CERTIFICATE OF CORRECTION

PATENT NO. : 5,568,032
DATED : October 22, 1996
INVENTOR(S) : SHINJI WAKUI

It is certified that error appears in the above-indentified patent and that said Letters Patent is hereby corrected as shown below:

COLUMN 13

Line 18, "includes" should read --include--.

COLUMN 14

Line 18, "takes" should read --take--.

Signed and Sealed this

First Day of April, 1997

Attest:

BRUCE LEHMAN

Attesting Officer

Commissioner of Patents and Trademarks